(No Model.)
J. S. SMITH.
POWDER DISTRIBUTER.
No. 247,124.
Patented Sept. 13, 1881.
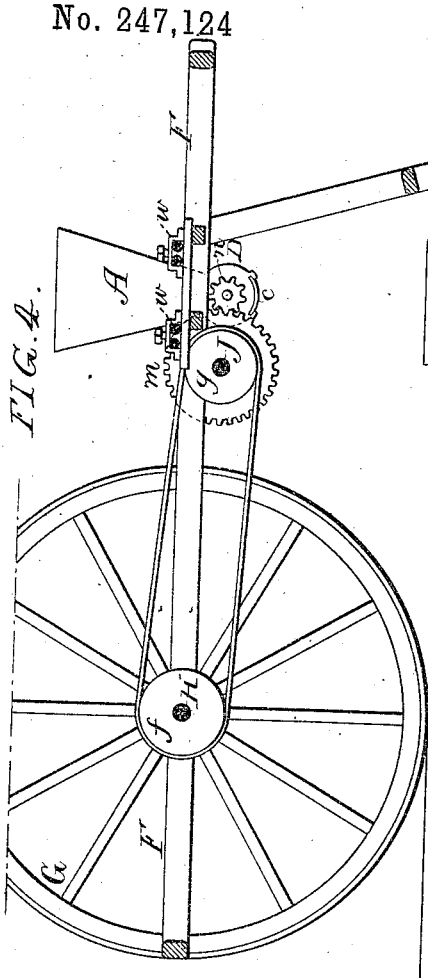
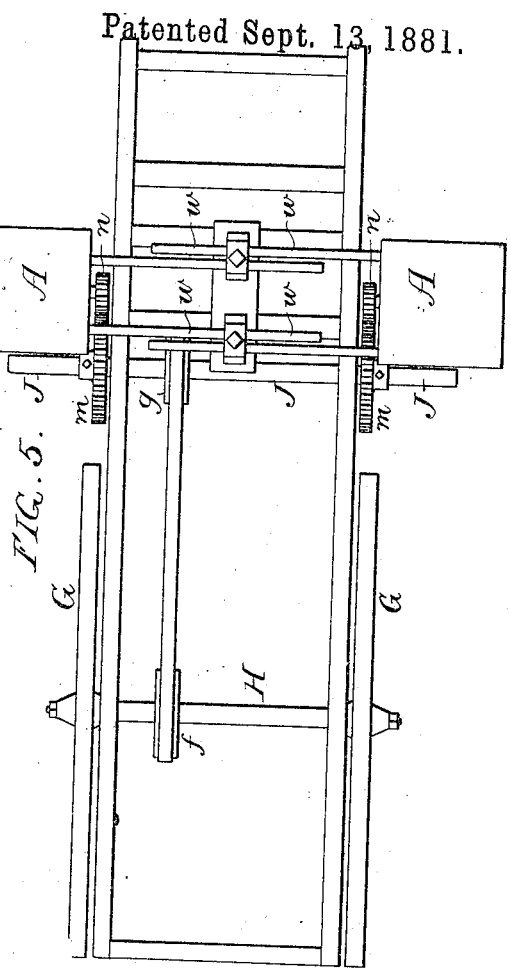
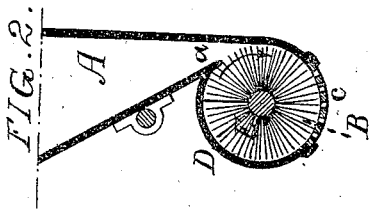
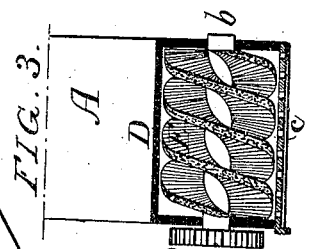
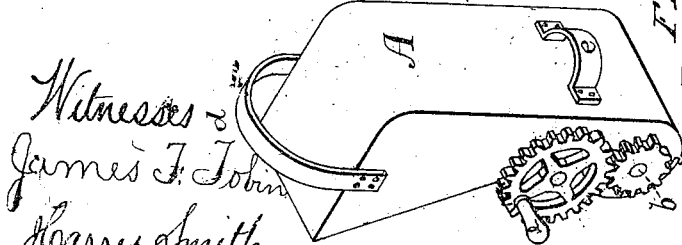
Witnesses
James J. John
Harry Smith
Inventor
Joseph S. Smith
by his Attorneys
Howson and Sons

UNITED STATES PATENT OFFICE.

JOSEPH S. SMITH, OF COLMAR, ASSIGNOR OF TWO-THIRDS TO EDWARD H. BUCKLEY, OF PHILADELPHIA, AND MARTHA A. SMITH, OF COLMAR, PENNSYLVANIA.

POWDER-DISTRIBUTER.

SPECIFICATION forming part of Letters Patent No. 247,124, dated September 13, 1881.

Application filed June 27, 1881. (No model.)

*To all whom it may concern:*

Be it known that I, JOSEPH S. SMITH, a citizen of the United States, residing in Colmar, Montgomery county, Pennsylvania, have invented certain Improvements in Powder-Distributers, of which the following is a specification.

The object of my invention is to construct a simple and effective device for uniformly distributing powdered substances, such as fertilizers, compounds for destroying potato-bugs, or other powdered materials used in agricultural operations; and this object I attain in the manner hereinafter set forth, reference being had to the accompanying drawings, in which—

Figure 1 is a perspective view of one form of my improved powder-distributer; Figs. 2 and 3, transverse and longitudinal sections of the same, respectively; Fig. 4, a longitudinal section of another form of the device, and Fig. 5 a plan view of Fig. 4.

A is a receptacle of any suitable size or shape, having at the top a feed-opening, and communicating at the bottom through a slot, $a$, with a chamber, B, contained within a segmental casing, D, secured to or forming part of the casing of the receptacle A. The casing D has on the under side a perforated plate, $c$, and in the ends of said casing are formed bearings for the shaft $b$ of a spiral brush, E, which is driven in the direction of the arrow either by a crank applied directly to the end of the shaft $b$ or by means of suitable gearing, as described hereinafter. As the brush is rotated the powdered material falls from the receptacle A through the slot $a$ and into the spaces between the spiral rows of bristles forming the brush, the latter extending continuously from end to end of the brush, thereby effecting the uniform and thorough distribution of the powder through the perforations in the plate $c$. Said plate is detachable, so that plates of different degrees of fineness may be used, in accordance with the character of the material to be distributed.

In the device shown in Figs. 1, 2, and 3 the receptacle A is furnished with a shoulder-strap, $d$, and handle $e$, so that it is adapted to be carried upon one arm, the brush-shaft being rotated by means of the gearing shown, which is operated by the other hand as the person carrying the device walks along the row of plants to which the powder is to be applied.

When a device of greater capacity is required I prefer to adopt the form shown in Figs. 4 and 5, in which F represents a frame mounted upon wheels G, the latter being secured to a shaft, H, which turns in bearings on the frame, and is furnished with a pulley, $f$, a belt from which passes round a pulley, $g$, on a shaft, J, also adapted to bearings on the frame F. The shaft J projects laterally beyond the frame F on each side, and to these laterally-projecting portions of the shaft are adapted cog-wheels $m$ $m$, one of which gears into the pinion $n$ on the brush-shaft of a distributer, A, at one side of the machine, the other wheel $m$ gearing into a pinion on the brush-shaft of a similar distributer A at the opposite side of the machine.

As the mounted frame, occupying the space between two rows of plants, is pushed over the ground the distributers are carried over the rows of plants, and the brushes of said distributers are actuated by the belts and gearing so as to uniformly distribute the powder over the plants. The distributers are carried by bars $w$, which are adapted to suitable guides on the frame F, and are capable of sliding in said guides, so that the distributers may be adjusted laterally in respect to the frame F, in order to adapt the machine to differently-spaced rows, the bars $w$ being secured in position after adjustment, so as to firmly retain the distributers.

The cog-wheels $m$ are also adjustable laterally on the projecting portions of the shaft J, suitable set-screws or other means being used to secure them to said shaft.

It is advisable in most cases to provide the frame F with a large box or receptacle for containing a supply of the powdered material, from which the receptacles A can be replenished as desired without the necessity of frequently returning to the main source of supply.

It is advisable, also, to provide the cog-wheels $m$ or pinions $n$ with clutches, whereby the brush of either of the distributers can be thrown out of gear and the distribution of powder stopped, when desired, without stopping the forward movement of the machine, so that the application of powder to either or both rows of plants can be governed as desired.

Instead of using clutches, the receptacles A may be moved longitudinally on the frame F, so as to carry either of the pinions n out of gear with its wheel m when it is desired to stop the operation of the brush.

I claim as my invention—

A powder-distributer in which are combined the receptacle A, the distributing-chamber B, communicating with said receptacle, and having a casing, D, with perforated portion c, and the brush E, conforming to the casing D, and having brush material arranged thereon in spiral rows, which extend continuously from end to end of the brush, as set forth.

In testimony whereof I have signed my name to this specification in the presence of two subscribing witnesses.

JOSEPH S. SMITH.

Witnesses:
 JAMES F. TOBIN,
 HARRY SMITH.